United States Patent
Doan et al.

(10) Patent No.: US 7,478,134 B2
(45) Date of Patent: Jan. 13, 2009

(54) DYNAMIC INFORMATION SELECTION BASED ON ASSOCIATED DATA

(75) Inventors: Christopher Hoang Doan, Austin, TX (US); David Kulczar, Austin, TX (US); Leonel Saenz, III, Austin, TX (US); Thanh K. Tran, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 951 days.

(21) Appl. No.: 11/014,160

(22) Filed: Dec. 16, 2004

(65) Prior Publication Data

US 2006/0168027 A1    Jul. 27, 2006

(51) Int. Cl.
  *G06F 15/16* (2006.01)
(52) U.S. Cl. ...................... 709/206; 709/207
(58) Field of Classification Search ............... 709/204, 709/206–207
See application file for complete search history.

(56) References Cited

U.S. PATENT DOCUMENTS

| | | | | |
|---|---|---|---|---|
| 6,078,956 A * | 6/2000 | Bryant et al. | ........... | 709/224 |
| 6,446,115 B2 * | 9/2002 | Powers | ........... | 709/206 |
| 6,510,453 B1 * | 1/2003 | Apfel et al. | ........... | 709/206 |
| 6,643,684 B1 | 11/2003 | Malkin et al. | ........... | 709/206 |
| 6,772,196 B1 * | 8/2004 | Kirsch et al. | ........... | 709/206 |
| 6,779,178 B1 * | 8/2004 | Lloyd et al. | ........... | 717/174 |
| 6,948,130 B2 * | 9/2005 | Long et al. | ........... | 715/752 |
| 7,216,232 B1 * | 5/2007 | Cox et al. | ........... | 713/176 |
| 2001/0034769 A1 * | 10/2001 | Rast | ........... | 709/206 |
| 2005/0102520 A1 * | 5/2005 | Baxter et al. | ........... | 713/176 |
| 2006/0288219 A1 * | 12/2006 | Adams et al. | ........... | 713/176 |

FOREIGN PATENT DOCUMENTS

| | | |
|---|---|---|
| JP | 11085641 | 3/1999 |
| JP | 2000250830 | 9/2000 |
| JP | 2003006116 | 1/2003 |

\* cited by examiner

*Primary Examiner*—John Follansbee
*Assistant Examiner*—Saket K Daftuar
(74) *Attorney, Agent, or Firm*—VanLeeuwen & VanLeeuwen; Justin M. Dillon

(57) ABSTRACT

A method for dynamic information selection based on associated is presented. A user configures a plurality of endnotes in order to assign one of the endnotes to a recipient address. Each endnote may include signature text (e.g., name, phone number, etc.), as well as images, web page links, and/or animation, which add to the aesthetics and personalization of a constructed email message. When a user creates an email message that includes one or more email recipient addresses, an endnote manager analyzes each email recipient address and automatically selects one of the configured endnotes based on the email recipient's assigned endnote category. In addition, a user may configure the endnote manager to select an endnote to include in an email messages based upon the time at which the email is created.

1 Claim, 7 Drawing Sheets

DYNAMIC INFORMATION SELECTION BASED ON ASSOCIATED DATA

BACKGROUND OF THE INVENTION

1. Technical Field

The present invention relates in general to a system and method for dynamic information selection based on associated data. More particularly, the present invention relates to a system and method for identifying an endnote category that is assigned to an email recipient address, and inserting a corresponding endnote in an email message that is sent to the email recipient address.

2. Description of the Related Art

The computer industry has revolutionized the way in which information is shared between people. During a person's day, the person may use an electronic mail (email) system to send information to work associates as well as to friends and family. In fact, email has become the preferred means of sharing information for a variety of reasons.

First, email is virtually instantaneous. A person may send an email message to a recipient that lives on the other side of the world in a matter of milliseconds. Second, email is convenient due to the fact that a person may send an email message to multiple recipients at once, and may also attach computer files to the email message for the recipients to view. Third, email messages may be tracked. A user may keep a log record of email messages that the user sends to recipients. In turn, the user may reference the log record when a discrepancy arises as to whether the user sent a particular email message to a recipient.

In order to provide a user with timesaving steps in which to generate an email message, email applications allow a user to configure his email system such that a signature, or "endnote," is included at the end of each email. For example, a user may configure an endnote that includes the user's name, work phone number, and work address. In this example, the email application includes the user's endnote at the end of each email message that the user sends to an email recipient.

Although existing art saves a user time by including an endnote with each email message, a challenge found is in endnote "personalization." For example, a user may wish to include a business-related endnote in emails that are sent to business associates, and include a personal endnote in emails that are sent to friends and family members.

What is needed, therefore, is a system and method for including an endnote in an email message that is personalized based upon the email message recipient.

SUMMARY

It has been discovered that the aforementioned challenges are resolved by using a system and method for identifying an endnote that corresponds to an email recipient's address and including the endnote in an email message that is sent to the recipient address. A user configures a plurality of endnotes in order to assign one of the endnotes to a recipient address. Each endnote may include signature text (e.g., name, phone number, etc.), as well as images, web page links, and/or animation, which add to the aesthetics and personalization of a constructed email message. As a result, an endnote manager automatically selects one of the configured endnotes based on an email recipient's assigned endnote category and/or the current time or schedule of the email document creation.

The user uses an email interface to generate an email message to send to one or more recipients. The email interface may be a standard email software application such as Netscape Messenger, Outlook Express, Lotus Notes, or Internet Explorer. The user's email message includes a message body and one or more recipient addresses. In turn, the email interface sends the recipients' addresses to an endnote manager. The endnote manager may be a separate software program from the email interface, or, in one embodiment, the endnote manager may be integrated into the email interface.

The endnote manager retrieves preferences from a storage area, whereby the preferences include user-specified global preferences, such as whether to use a particular endnote based upon the time of day, or which "default" endnote to use if a recipient address has not been assigned an endnote category.

The endnote manager selects a first recipient address that corresponds to the email message, and identifies the first recipient address's endnote category. The endnote manager uses the identified endnote category to determine which endnote to include in the email message to send to the first recipient. For example, the endnote manager may identify that a "business" endnote category is assigned to the first recipient address and, in turn, include a "business" endnote in the first recipient's email message.

The endnote manager continues to analyze each recipient address that corresponds to the email message, and determines a particular endnote for each recipient based upon each recipient's assigned endnote category. If an endnote category has not been assigned to a particular recipient address, the endnote manager may reference user-specified preferences in order to determine a default endnote to include in the corresponding recipient's email message.

When the user configures the endnote manager to select endnotes based upon a particular time of day, the endnote manager identifies a timeframe endnote to include in each email message that is sent to each recipient. For example, the user may configure the endnote manager to include a "business" endnote in each email message that is sent between the hours of 8:00 AM and 5:00 PM, and include a "leisure" endnote in email messages that are sent during any other time of the day.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
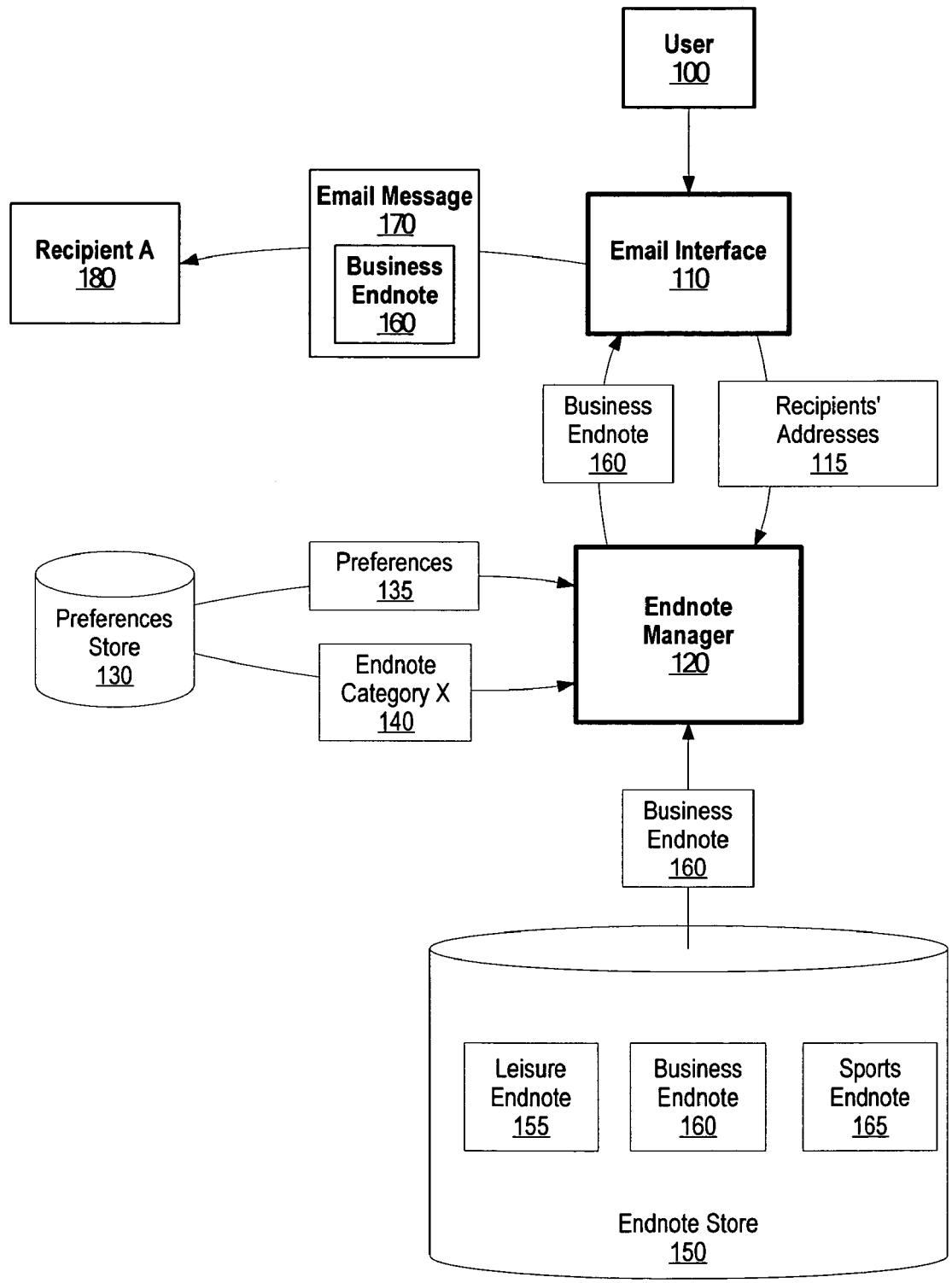
FIG. 1 is a diagram showing an endnote manager identifying a particular endnote to include in an email message that is sent to an email recipient.

FIG. 1 is a diagram showing an endnote manager identifying a particular endnote to include in an email message that is sent to an email recipient. User 100 configures a plurality of endnotes in order to assign one of the endnotes to a recipient address. Each endnote may include signature text (e.g., name, phone number, etc.), as well as images, web page links, and/or animation, which add to the aesthetics and personalization of a constructed email message. As a result, an endnote manager (e.g., endnote manager 120) automatically selects one of the configured endnotes based on a recipient's assigned endnote category and/or the current time or schedule of the email document creation.

User 100 uses email interface 110 to generate an email message to be sent to one or more recipients. Email interface 110 may be a standard email software application such as Netscape Messenger, Outlook Express, Lotus Notes, or Internet Explorer. User 100's email message includes a message body and one or more recipient addresses (e.g., recipients' addresses 115). Email interface 110 sends recipients' addresses 115 to endnote manager 120. Endnote manager 120 may be a separate software program from email interface 110, or, in one embodiment, endnote manager 120 may be integrated into email interface 110.

Figure 3A:
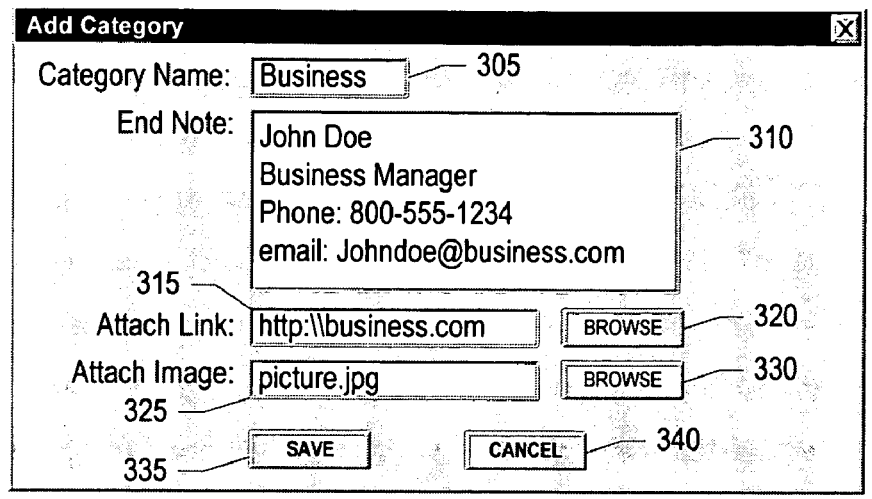
FIG. 3A is user interface window that allows a user to create a new endnote category.
Figure 3B:
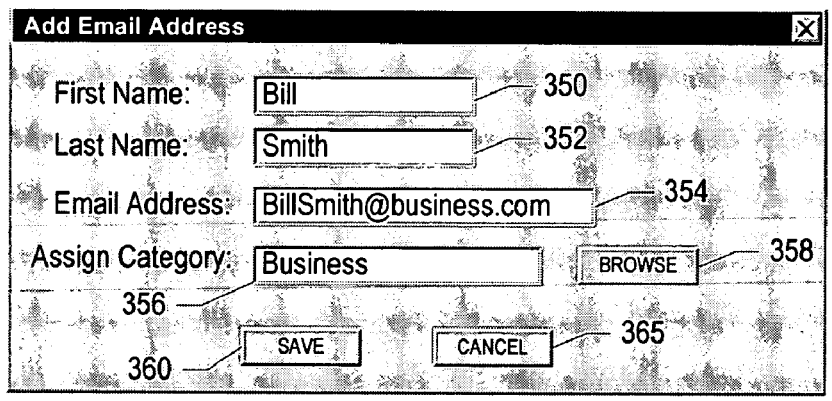
FIG. 3B is user interface window that allows a user to assign an endnote category to an email recipient address.
Figure 3C:
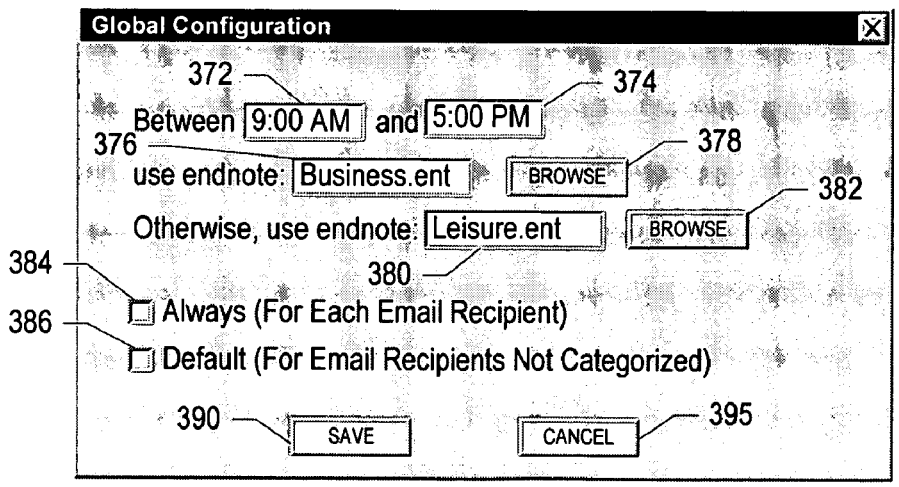
FIG. 3C is user interface window that allows a user to configure global preferences for endnote identification.

Endnote manager 120 retrieves preferences 135 from preferences store 130, whereby preferences 135 includes user-specified global preferences, such as whether to use a particular endnote based upon the time of day and which endnote to use if a recipient address has not been assigned an endnote category (see FIG. 3C and corresponding text for further details regarding global configuration preferences). Preferences store 130 may be stored on a nonvolatile storage area, such as a computer hard drive.

Endnote manager 120 selects a first recipient address from recipients' addresses 115, and identifies endnote category X 140 as the endnote category that is assigned to the first recipient address. User 100 previously configured a plurality of endnotes, which are included in endnote store 150 (e.g., leisure endnote 155, business endnote 160, and sports endnote 165). For example, leisure endnote 155 may include user 100's home phone number and home address, whereas business endnote 160 may include user 100's business phone number and business address, and sports endnote 165 may include user 100's home address, a web page link, and a logo image of user 100's favorite sports team. Endnote store 150 may be stored on a nonvolatile storage area, such as a computer hard drive.

Endnote manager 120 uses category X 140 to identify which endnote to retrieve from endnote store 150. The example shown in FIG. 1 shows that category X 140 corresponds to business endnote 160. Therefore, endnote manager 120 retrieves business endnote 160 from endnote store 150, and provides business endnote 160 to email interface 110. Email interface 110 includes business endnote 160 in email message 170, and sends email message 170 to recipient A 180. Recipient A 180 corresponds to the first recipient address that was selected by endnote manager 120.

Endnote manager 120 continues to analyze each recipient address that is included in recipients' addresses 115, and provide a particular endnote for each recipient based upon the endnote category that is assigned to each recipient address. If a recipient address has not been categorized, endnote manager 120 uses preferences 135 to identify a default endnote to provide to email interface 110 (see FIG. 6 and corresponding text for further details regarding recipient endnote identification).

When user 100 wishes endnote manager 120 to select endnotes based upon a particular time of day, endnote manager 120 identifies a timeframe endnote to include in each email message that is sent to each recipient. For example, user 100 may configure endnote manager 120 to use a business endnote for each email message that is sent between the hours of 8:00 AM and 5:00 PM, and use a leisure endnote for email messages for email messages that are sent during any other time of the day (see FIG. 2 and corresponding text for further details regarding timeframe endnote selection).

In one embodiment, user 100 may assign a "domain" endnote category to a domain instead of a particular email address. For example, the user may assign a "business" endnote to a domain "mycompany.com" such that endnote manager 120 provides business endnote 160 to email interface 110 whenever user 110 sends an email message to a recipient address that includes "mycompany.com." In addition, endnote manager 120 may be configured to override the domain endnote category if a recipient address has been assigned an alternative endnote category. Using the example described above, "sally@mycompany.com" may be assigned a "leisure" endnote category and, therefore, endnote manager 120 provides leisure endnote 155 to email interface 110 instead of business endnote 160.

Figure 2:
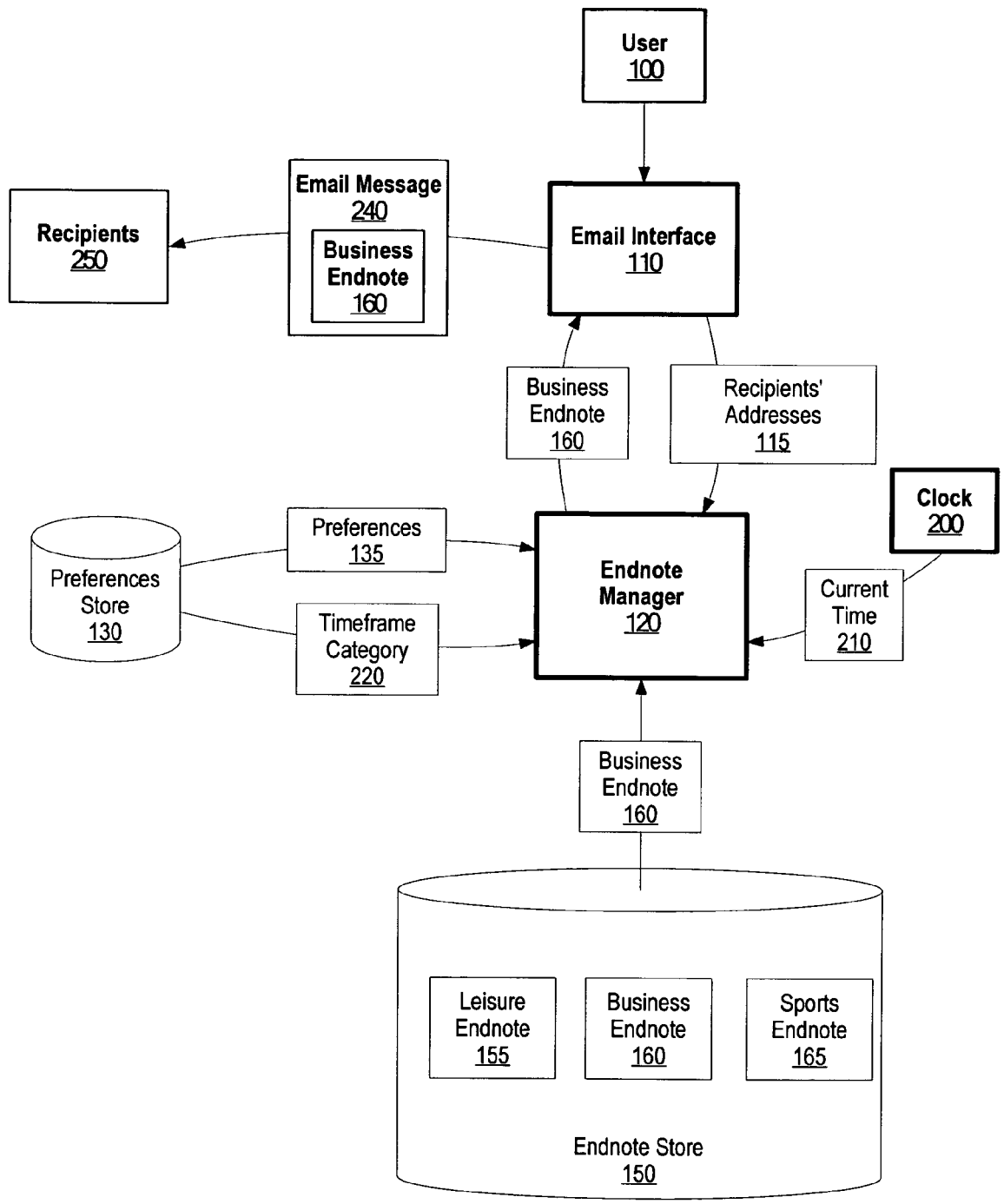
FIG. 2 is a diagram showing an endnote manager identifying an endnote that corresponds to an email recipient address based upon a timeframe in which the email message is created.

FIG. 2 is a diagram showing an endnote manager identifying an endnote that corresponds to an email recipient address based upon a timeframe in which the email message is created. FIG. 2 is similar to FIG. 1 with the exception that endnote manager 120 determines, using preferences 135, that user 100 has enabled "timeframe endnote mode." In timeframe endnote mode, endnote manager 120 selects an endnote based upon the time that the email message is sent (see FIG. 3C and corresponding text for further details regarding timeframe endnote enablement details).

Endnote manager 120 determines that timeframe endnote mode is enabled, and retrieves current time 210 from clock 200. Clock 200 is a device that tracks time, such as a computer system clock. Endnote manager 120 uses current time 210 to identify timeframe category 220, which it retrieves from preferences store 130. Timeframe category 220 corresponds to one of the endnotes that are included in endnote store 150, whereby timeframe category 220 corresponds to the value of current time 210. For example, if the current time is 9:00 AM, timeframe category 220 may be "business," which, in turn, corresponds to business endnote 160.

Endnote manager 120 retrieves the endnote that corresponds to timeframe category 220, such as business endnote 160, from endnote store 150. Endnote manager 120 provides business endnote 160 to email interface 110. Since user 100 enabled timeframe endnote mode, email interface 110 includes business endnote 160 in each email message 240 that is sent to recipients 250. User 100, email interface 110, recipients' addresses 115, endnote manager 120, preferences store 130, preferences 135, endnote store 150, leisure endnote 155, business endnote 160, and sports endnote 165 are the same as that shown in FIG. 1.

FIG. 3A is user interface window that allows a user to create a new endnote category. A user creates an endnote category in order to assign the endnote category to one or more email recipient addresses. A computer system displays window 300 when the user requests to create a new endnote category, and displays a similar window when the user wishes to modify an existing endnote category.

Window 300 includes text box 305 and 310. A user enters a name of an endnote category in text box 305, and includes signature information, such as a name, address, and phone number, in text box 310. When the use wishes to include a web page link in the endnote, the user may select command button 320, which allows the user to search for a particular web page link. When the user selects a web page link, the web page link address is displayed in text box 315. The user may also wish to include an image, such as a family picture or cartoon, in the endnote. As such, the user selects command button 330, which allows the user to search for a particular image. When the user selects an image, the image's file name is displayed in text box 325.

The user selects command button 335 in order to save the endnote category information, or the user may select command button 340 to cancel the endnote category information. Once an endnote category is created, the user may assign the endnote category to an email recipient address (see FIG. 3B and corresponding text for further details regarding endnote category assignment).

FIG. 3B is user interface window that allows a user to assign an endnote category to an email recipient address. Window 345 is an example of a standard user interface window that allows a user to add an email recipient address, with the addition of an area to assign an endnote category to the recipient address.

Window 340 includes text boxes 350 and 352, which a user enters a recipient's first name and last name, respectively. The user also enters a recipient address in text box 354. When the user wishes to assign an endnote category to the recipient address that is specified in text box 354, the user selects command button 358, which allows the user to search for a particular endnote category. When the user selects an endnote category, the endnote category's name is displayed in text box 356.

The user selects command button 360 to save the email address information and assign the selected endnote category to the recipient address. Or, the user may select command button 365 to cancel the email address information. When a user does not assign an endnote category to a recipient address, a computer system may identify a default endnote in which to include in email messages that are sent to the recipient address (see FIGS. 3C, 6, and corresponding text for further details regarding default endnote assignment).

FIG. 3C is user interface window that allows a user to configure global preferences for endnote identification. A user configures global preferences in order to enable timeframe endnote mode and/or to specify a particular default endnote. For example, a user may configure window 370 such that a "business" endnote is included in each email message that is generated between the hours of 9:00 AM and 5:00 PM, and use a "leisure" endnote for email messages that are generated any other time of the day.

When a user wishes to enable timeframe endnote mode, the user enters a timeframe, which is the time between a start time and end time in text boxes 372 and 374, respectively. In addition, the user selects command button 378 to search for an endnote category that his computer system should use between the timeframe. When the user selects a category, the endnote category is displayed in text box 376. Furthermore, the user selects command button 382 to search for an endnote category that the computer system should use at times other than those that are specified between the times in text boxes 372 and 374. When the user selects an endnote category using command button 382, the endnote category is displayed in text box 380.

The user selects check box 384 when the user wishes to enable timeframe endnote mode. By selecting check box 384, the user's computer system includes a timeframe endnote, based upon the criteria included in window 370, for each email message to each email recipient. The user may select check box 386 in order to set a default flag, which instructs the user's computer system to select a timeframe endnote for those recipient addresses that have not been assigned an endnote category. For example, when a user sends an email to an email recipient whose recipient address is not assigned an endnote category, the user's computer system identifies a current time and selects a default endnote based on the current time to include in an email message (see FIGS. 2, 6, and corresponding text for further details regarding default endnote and timeframe endnote inclusion).

The user selects command button 390 to save the configuration preference changes. Or, if the user does not wish to save the configuration preferences, the user selects command button 395 in order to cancel the configuration preference changes.

Figure 4:
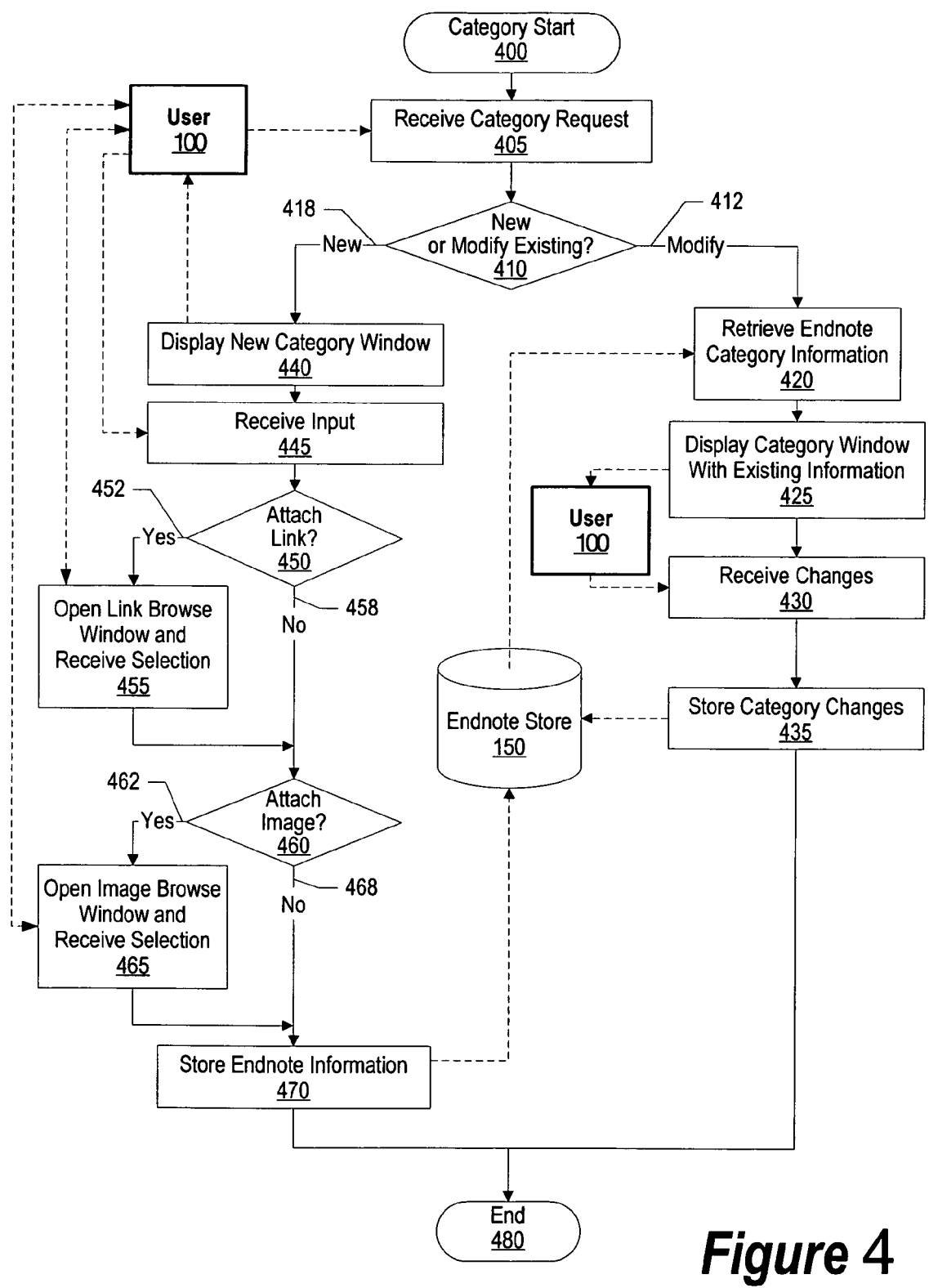
FIG. 4 is a flowchart showing steps taken in creating or modifying an endnote category.

FIG. 4 is a flowchart showing steps taken in creating or modifying an endnote category. A user creates endnote categories in order to assign an endnote category to a recipient address. Processing commences at 400, whereupon processing receives a category request from user 100 (step 405). User 100 is the same as that shown in FIG. 1, and may use an email interface, such as email interface 110, which is also shown in FIG. 1.

A determination is made as to whether user 100 wishes to create a new endnote category or modify an existing endnote category (decision 410). If user 100 wishes to modify an existing endnote category, decision 410 branches to "Modify" branch 412 whereupon processing retrieves existing endnote information that corresponds to the user's category request from endnote store 150 at step 420. For example, the existing endnote information may include a signature (i.e. name and home phone number) as well as a web page link. Endnote store 150 is the same as that shown in FIG. 1.

At step 425, processing displays the existing endnote category information to user 100 using a user interface window, such as one similar to that shown in FIG. 3A. Processing receives changes from user 100 at step 430, stores the changes to the endnote category in endnote store 150 at step 435, and category processing ends at 480.

On the other hand, if user 100 wishes to add a new endnote category, decision 410 branches to "New" branch 418 whereupon processing displays a new category window, such as that shown in FIG. 3A, to user 100 (step 440). Processing receives input from user 100 at step 445. A determination is made as to whether user 100 wishes to attach a web page link to the new endnote category (decision 450). If user 100 wishes to attach a web page link to the new endnote category, decision 450 branches to "Yes" branch 452 whereupon processing displays a "Browse" window to user 100, and receives a link address from user 100 at step 455. On the other hand, if user 100 does not wish to attach a web page link to the new endnote category, decision 450 branches to "No" branch 458 bypassing link attachment steps.

A determination is made as to whether user 100 wishes to attach an image, such as a picture, to the new endnote category (decision 460). If user 100 wishes to attach an image to the new endnote category, decision 460 branches to "Yes" branch 462 whereupon processing displays a "Browse" window to user 100, and receives an image address from user 100 at step 465. On the other hand, if user 100 does not wish to attach an image to the new endnote category, decision 460 branches to "No" branch 468 bypassing image attachment steps.

At step 470, processing stores the new endnote category information in endnote store 150. In turn, user 100 is able to assign the new endnote category to email recipient addresses (see FIG. 3B and corresponding text for further details regarding endnote category assignment) Category processing ends at 480.

Figure 5:
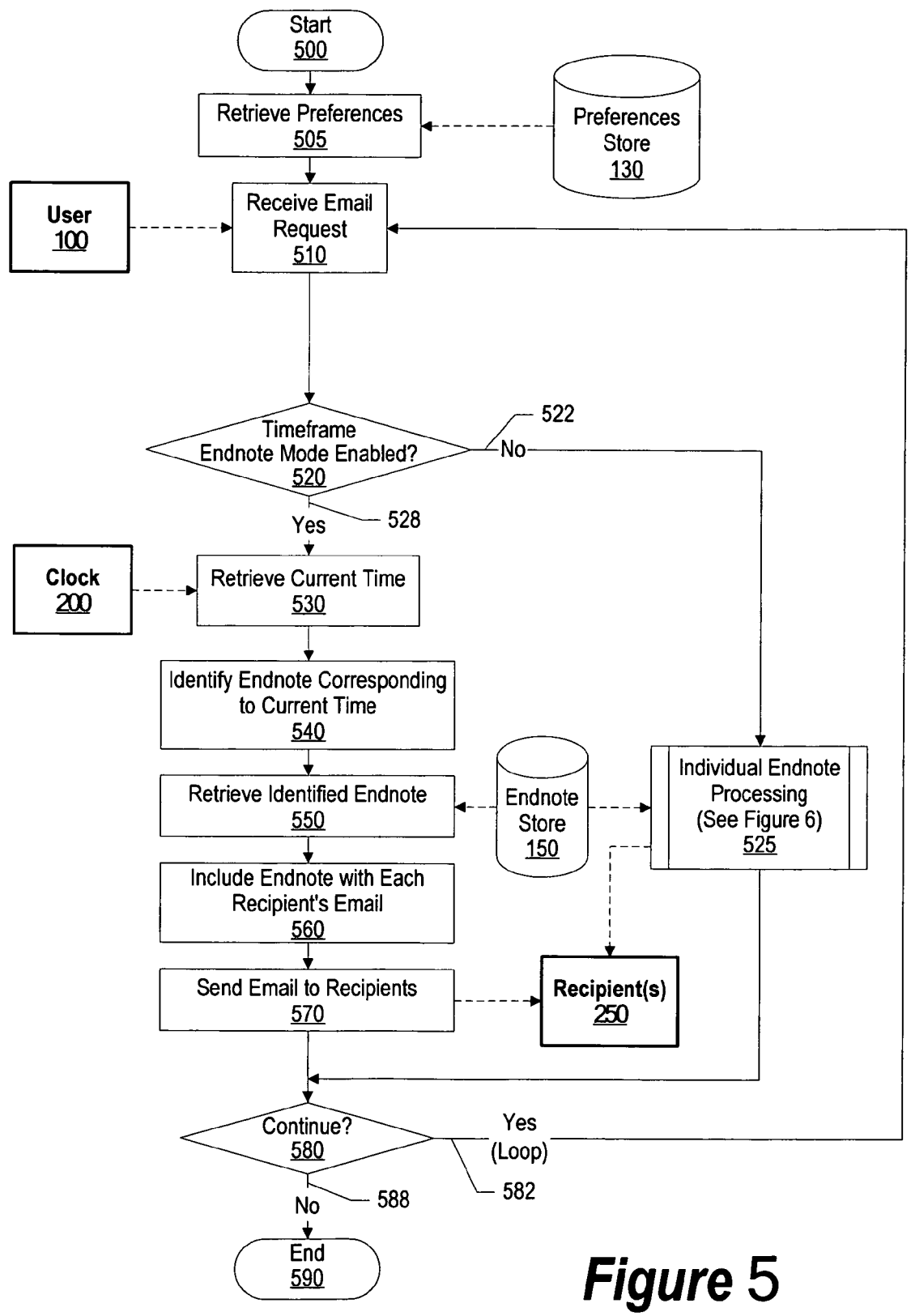
FIG. 5 is a flowchart showing steps taken in including an endnote in an email message based upon particular user preferences.

FIG. 5 is a flowchart showing steps taken in including an endnote in an email message based upon particular user preferences. A user configures a computer system to include a particular endnote in an email message based upon an email recipient's address. For example, a user may wish to include a "business" endnote in emails that are sent to business associates, and include a "leisure" endnote in emails that are sent to family and friends. In addition, the user may enable a "timeframe endnote mode," whereby the user's computer system includes an endnote based upon the time in which an email is sent to a recipient.

Processing commences at 500, whereupon processing retrieves global preferences from preferences store 130 at step 505. The global preferences include whether a user has enabled timeframe endnote mode and timeframe endnote categories. At step 510, processing receives an email request from user 100. The email request includes one or more email recipient addresses and an email body. User 100 and preferences store 130 are the same as that shown in FIG. 1.

A determination is made as to whether timeframe endnote mode is enabled (decision 520). If timeframe endnote mode is not enabled, decision 520 branches to "No" branch 522 whereupon processing identifies a particular endnote to include in each email message that is sent to each email recipient (pre-defined process block 525, see FIG. 6 and corresponding text for further details).

On the other hand, if the timeframe endnote mode is enabled, decision 520 branches to "Yes" branch 528 whereupon processing retrieves a current time from clock 200. At step 540, processing uses the current time to identify a timeframe endnote category based upon user-specified preferences. For example, a user may configure preferences such that processing identifies a "business" endnote category between the hours of 8:00 AM and 5:00 PM. Clock 200 is the same as that shown in FIG. 2.

Processing uses the identified timeframe endnote category to retrieve a corresponding endnote from endnote store 150 at step 550. Endnote store 150 is the same as that shown in FIG. 1. Since timeframe endnote mode is enabled, processing includes the retrieved endnote in each email recipient's email message (step 560), and sends email messages to recipients 250 at step 570. Recipients 250 are the same as that shown in FIG. 2.

A determination is made as to whether to continue processing (decision 580). If processing should continue, decision 580 branches to "Yes" branch 582 which loops back to receive more email requests. This looping continues until processing should stop, at which point decision 580 branches to "No" branch 588 whereupon processing ends at 590.

Figure 6:
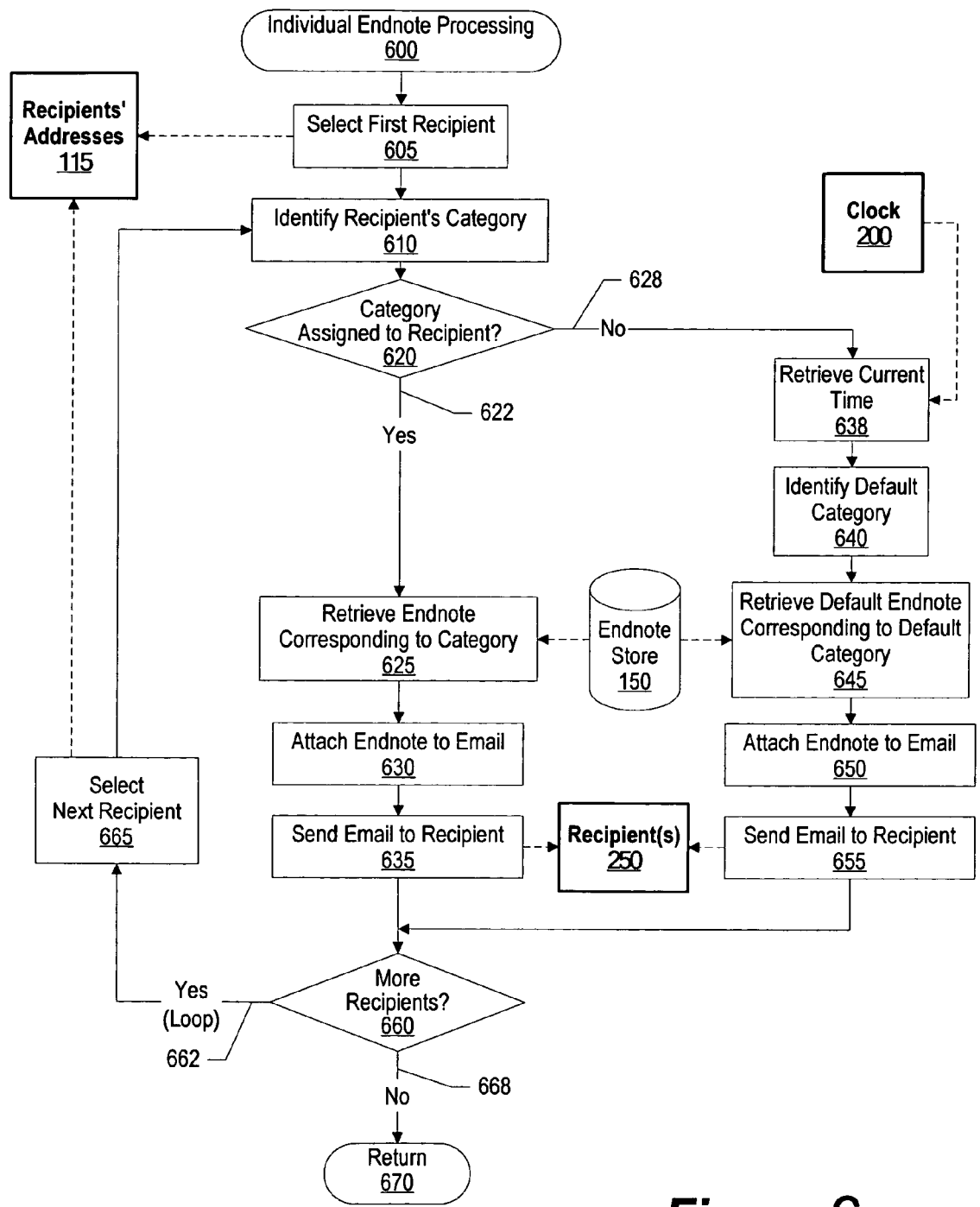
FIG. 6 is a flowchart showing steps taken in identifying an endnote for each email recipient that is included in an email message.

FIG. 6 is a flowchart showing steps taken in identifying an endnote for each email recipient that is included in an email message. When timeframe endnote mode is not enabled, a user's computer system identifies a particular endnote for each email recipient. If an email recipient is not assigned an endnote category, the user's computer system includes a default endnote in the email recipient's email message. For example, the user may configure his computer system to include a "generic" endnote in emails whose recipient addresses are not assigned an endnote category.

Processing commences at 600, whereupon processing selects a first recipient address from recipients' addresses 115 at step 605. Recipients' addresses 115 is the same as that shown in FIG. 1. At step 610, processing identifies an endnote category that is assigned to the first recipient address. A user may assign an endnote category to a recipient address by means of a user interface window, such as one that is shown in FIG. 3B.

A determination is made as to whether the recipient address is assigned to an endnote category (decision 620). If the recipient address is assigned to an endnote category, decision 620 branches to "Yes" branch 622 whereupon processing retrieves an endnote that corresponds to the assigned endnote category from endnote store 150 (step 625). Endnote store 150 is the same as that shown in FIG. 1. Processing attaches the retrieved endnote to an email message, and sends the email message to one of recipients 250 at step 635. Recipients 250 are the same as that shown in FIG. 2.

On the other hand, if the first recipient address is not assigned to an endnote category, decision 620 branches to "No" branch 628 whereupon processing retrieves a current time from clock 200 at step 638. Clock 200 is the same as that shown in FIG. 2. At step 640, processing identifies a default endnote category. A user may specify a default endnote that may or may not be based upon a current time. For example, a user may configure his computer system such that a "business" endnote is included in emails that are sent between the hours of 8:00 AM and 5:00 PM whose recipient address is not assigned an endnote category. In another example, the user may configure his computer system to use a "leisure" endnote for each email message that is sent to a recipient address that is not assigned an endnote category.

Processing retrieves the endnote that corresponds to the default endnote category from endnote store 150 at step 645. For example, processing may retrieve a "business" endnote from endnote store 150 because the current time is 2:00 PM. At step 650, processing includes the default endnote in an email message, and sends the email message to one of the recipients 250 (step 655).

A determination is made as to whether to send the email message to more recipients (decision 660). If there are more recipients for which to send the email message, decision 660 branches to "Yes" branch 662 which loops back to select (step 665) and process the next recipient address. This looping continues until there are no more recipient address for which to send the email message, in which case decision 660 branches to "No" branch 668 whereupon processing returns at 670.

Figure 7:
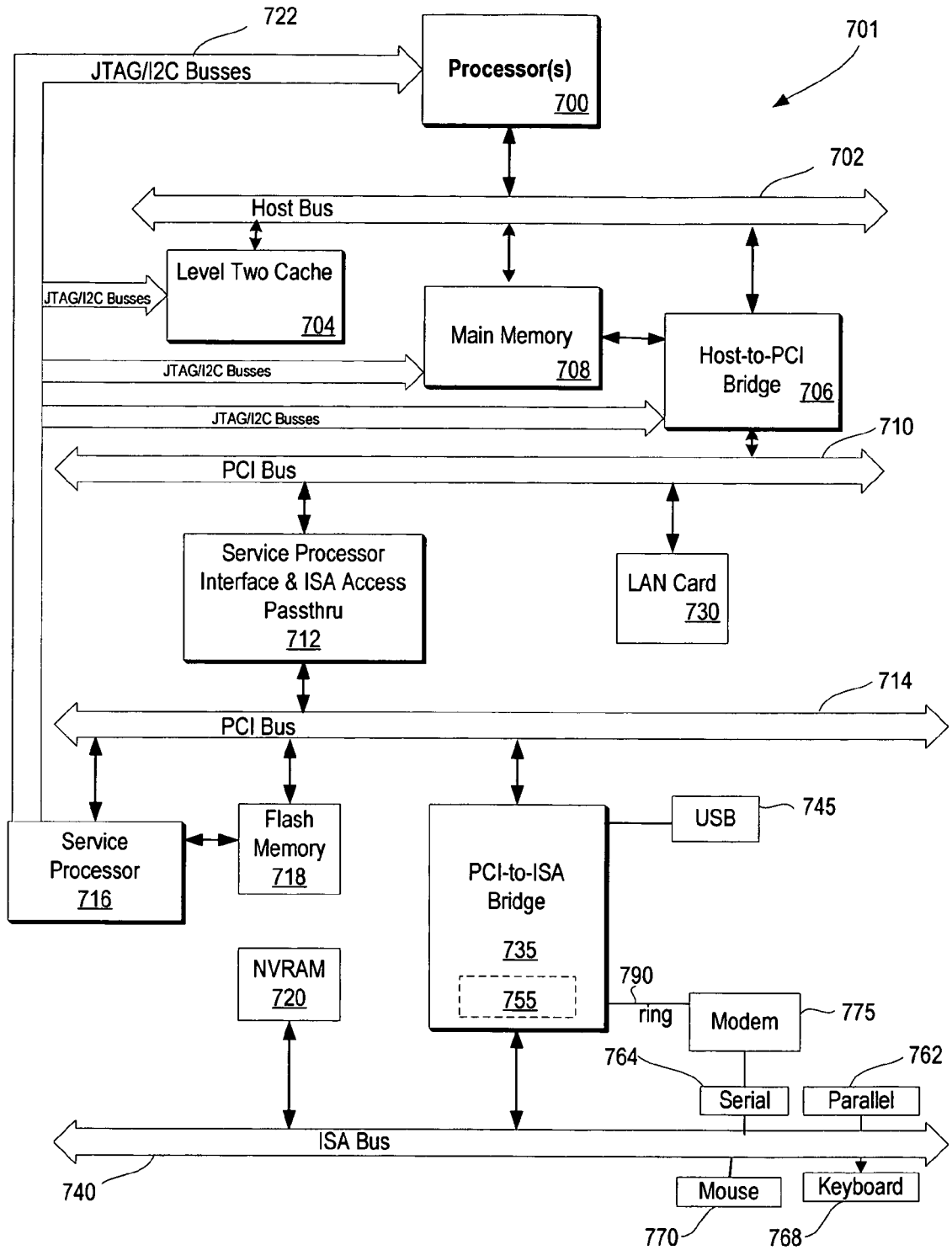
FIG. 7 is a block diagram of a computing device capable of implementing the present invention.

FIG. 7 illustrates information handling system 701, which is a simplified example of a computer system capable of performing the computing operations described herein. Computer system 701 includes processor 700, which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    receiving an email request, the email request including one or more recipient addresses;
    selecting a first recipient address from the recipient addresses;
    detecting that a default flag is enabled;
    assessing whether the first recipient address corresponds to an endnote category from a plurality of endnote categories in response to the detecting;
    determining that the first recipient address does not correspond to one of the endnote categories in response to the assessment;
    retrieving a current time in response to receiving the email request, wherein the current time is based upon a time at which the email message is sent to the first recipient address;
    identifying a first endnote from a plurality of endnotes that correspond to the current time;
    automatically including the first endnote in an email message;
    sending the email message to the first recipient address;
    selecting a second recipient address from the recipient addresses;
    identifying an endnote category from the plurality of endnote categories that corresponds to the second recipient address;
    automatically selecting a second endnote from a plurality of endnotes, wherein the selected second endnote corresponds to the identified endnote category;
    automatically including the second endnote in a subsequent email message; and
    sending the subsequent email message to the second recipient address.

* * * * *